US008364840B2

(12) United States Patent
Barros (10) Patent No.: US 8,364,840 B2
(45) Date of Patent: Jan. 29, 2013

(54) DYNAMIC MESSAGE ROUTING

(75) Inventor: Alistair P. Barros, Camira (AU)

(73) Assignee: SAP AG, Walldorf (DE)

( * ) Notice: Subject to any disclaimer, the term of this patent is extended or adjusted under 35 U.S.C. 154(b) by 1637 days.

(21) Appl. No.: 11/292,655

(22) Filed: Dec. 2, 2005

(65) Prior Publication Data

US 2007/0130363 A1   Jun. 7, 2007

(51) Int. Cl.
*G06F 15/173* (2006.01)
*G06F 15/16* (2006.01)
*G06F 15/18* (2006.01)
*G06F 17/00* (2006.01)

(52) U.S. Cl. ........ 709/238; 709/227; 709/230; 705/301; 706/14; 706/45; 706/48; 706/61

(58) Field of Classification Search .................. 709/238; 719/313; 705/301; 706/14–61
See application file for complete search history.

(56) References Cited

U.S. PATENT DOCUMENTS

| 5,218,676 | A  | * | 6/1993  | Ben-Ayed et al. ............ 709/240 |
| 6,023,702 | A  |   | 2/2000  | Leisten et al. |
| 6,038,538 | A  | * | 3/2000  | Agrawal et al. .............. 705/7.11 |
| 6,041,306 | A  |   | 3/2000  | Du et al. |
| 6,065,009 | A  |   | 5/2000  | Leymann et al. |
| 6,278,977 | B1 | * | 8/2001  | Agrawal et al. .............. 705/7.27 |
| 6,757,294 | B1 | * | 6/2004  | Maruyama ..................... 370/432 |
| 6,826,579 | B1 |   | 11/2004 | Leymann et al. |
| 6,901,425 | B1 |   | 5/2005  | Dykes et al. |
| 7,047,280 | B2 | * | 5/2006  | Hall et al. ..................... 709/206 |
| 7,139,999 | B2 |   | 11/2006 | Bowman-Amuah |
| 7,200,563 | B1 |   | 4/2007  | Hammitt et al. |
| 7,272,816 | B2 |   | 9/2007  | Schulz et al. |
| 7,428,597 | B2 | * | 9/2008  | Beunings ....................... 709/238 |
| 7,573,901 | B2 | * | 8/2009  | Hofmann et al. ............. 370/465 |
| 7,653,711 | B2 | * | 1/2010  | Jinks et al. ..................... 709/223 |
| 7,873,422 | B2 |   | 1/2011  | Dumas et al. |
| 2001/0055380 | A1 | * | 12/2001 | Benedyk et al. ............. 379/219 |
| 2002/0034186 | A1 | * | 3/2002  | Huang .......................... 370/401 |
| 2002/0040312 | A1 |   | 4/2002  | Dhar et al. |

(Continued)

FOREIGN PATENT DOCUMENTS

WO    WO 2005/119965    * 12/2005

OTHER PUBLICATIONS

Keen, Martin, BPEL4WS Business Processes with WebSphere Business Intregration, Dec. 2004, Pertinent pp. 28, 49, 57, 72-74, 77, 97, 118, 123, 244, 309.*

(Continued)

*Primary Examiner* — Yasin Barqadle
*Assistant Examiner* — Joe Chacko
(74) *Attorney, Agent, or Firm* — Brake Hughes Bellermann LLP (57) ABSTRACT

Various implementations are disclosed for routing messages according to a routing order, where sequences (e.g., subsections or subsets) of the routing order are progressively and/or iteratively resolved during a run-time of the message routing operation(s). The resolution of a sequence may involve determining identity information of recipients that were previously only described within the sequence in relation to one another, in relation to the group, or in relation to a type of routing order. Further, the resolution(s) of the sequences may depend at least in part on responses received from recipients of the message during execution of earlier (resolved) sequences of the message routing operations. In this way, message routing may occur dynamically, so that, for example, new recipients may be added, or a (new) message order may otherwise be realized or implemented, during the run-time of the routing operation.

19 Claims, 5 Drawing Sheets

U.S. PATENT DOCUMENTS

| | | | |
|---|---|---|---|
| 2002/0095493 A1* | 7/2002 | Byrnes | 709/224 |
| 2003/0035440 A1* | 2/2003 | Casaccia et al. | 370/473 |
| 2003/0043742 A1* | 3/2003 | De Maria et al. | 370/230 |
| 2003/0058813 A1* | 3/2003 | Viola et al. | 370/328 |
| 2003/0095523 A1* | 5/2003 | Korus et al. | 370/338 |
| 2003/0233374 A1 | 12/2003 | Spinola et al. | |
| 2003/0233479 A1* | 12/2003 | Keohane et al. | 709/248 |
| 2004/0042418 A1* | 3/2004 | Hamada et al. | 370/256 |
| 2004/0162741 A1 | 8/2004 | Flaxer et al. | |
| 2004/0199586 A1* | 10/2004 | Kaler et al. | 709/206 |
| 2004/0252694 A1* | 12/2004 | Adhikari et al. | 370/395.2 |
| 2005/0049906 A1* | 3/2005 | Leymann et al. | 705/8 |
| 2006/0143620 A1 | 6/2006 | Elms et al. | |
| 2007/0135936 A1* | 6/2007 | Dumas et al. | 700/29 |
| 2007/0150075 A1 | 6/2007 | Dumas et al. | |
| 2011/0296419 A1 | 12/2011 | Dumas et al. | |

OTHER PUBLICATIONS

Juan Miguel Gomez, A B2B conversational architecture for Semantic Web Services based on BPIMS-WS, 2005, pp. 1-8.*

Casati, Fabio "Specification and Implementation of Exceptions in Workflow Management Systems", ACM Transactions on Database Systems, vol. 24, No. 3, (Sep. 1999), pp. 405-451.

Benatallah, Boualem "Facilitating the Rapid Developments and Scalable Orchestration of Composite Web Services", Distributed and Parallel Databases, 17, 2005 Springer Science + Business Media, Inc., Manufactured in the Netherlands,(2005), pp. 5-37.

Sheng, Quan Z., "Enabling Personalized Composition and Adaptive Provisioning of Web Services", CAiSE 2004, LNCS 3084, Springer-Verlag Berlin Heidelberg 2004, pp. 322-337.

Hwang, San-Yih "Personal Workflows: Modeling and Management", MDM 2003, LNCS 2575, Springer-Verlag Berlin Heidelberg 2003, pp. 141-152.

Tolksdorf, Robert "Coordination Technology for Workflows on the Web: Workspace", Coordination 2000, LNCS 1906, Springer-Verlag Berlin Heidelberg 2000, pp. 36-50.

Geppert, D "Event-based Distributed Workflow Execution with EVE", pp. 1-15. URL:http://citeseer.nj.nec.com/33730.html, (Mar. 1, 1996).

Fjellheim, T "The 3DMA middleware for mobile application", Lecture Notes in Computer Science, springer verlag vol. 3207, (Aug. 2004), pp. 312-323.

Marlon, D. et al., "Event-Based Coordination of Process—oriented Composite Applications", Business Process Management 2005 Proceedings, (Sep. 8, 2005), pp. 236-251.

European Search report for Application No. 06017086.7, (Nov. 8, 2006), pp. 1-8.

"JavaSpaces TM specification", XP002957732, (1998), pp. 1-30.

"European Search Report 06 017 088.3", (Oct. 5, 2006).

Alast, W.M.P. V., et al., "YAWL: Yet Another workflow language", Information systems, 30(4), (2004), pp. 245-275.

Aalst, W.M.P. V., "How to handle dynamic change and capture management information: An approach based on generic workflow models", Computer Systems Science and Engineering, 15(5), (2001), pp. 295-318.

Aalst, W.M.P. V., et al., "Case handling: A new paradigm for business process support", Data and Knowledge Engineering, 53(2), (2005), pp. 129-162.

Cabri, G. et al., "Reactive tuple spaces for mobile agent coordination", In Proceedings of the Second International Workshop on Mobile Agents (1998), Stuttgart, Germany, Springer Verlag,(1999), pp. 237-248.

"European Search Report Received for EP Application No. 06017088.3 mailed on Oct. 5, 2006".

Fok, C. L., et al., "A lightweight coordination middleware for moble computing", in proceedings of the 6th International Conference on Coordination Models and Languages, Pisa , Italy, Springer Verlag,(Feb. 2004), pp. 135-151.

Muller, R. et al., "AgentWork: a workflow system supporting rule-based workflow adaptation", Data and Knowledge Engineering, 51(2), (Nov. 2004), pp. 223-256.

Rinderle, S. et al., "Correctness criteria for dynamic changes in workflow systems—a survey", Data and Knowledge Engineering, 50(1), (2004), pp. 9-34.

Wohed, P. et al., "Pattern-based Analysis of the Control-flow Perspective of UML Activity Diagrams", in proceedings of the International Conference on Conceptual Modelling (ER), Klagenfurt, Austria, Springer Verlag,(Oct. 2004).

Gelernter, D. et al., "Generative communication in Linda", ACM Transactions on programming, 2(1), (Jan. 1985),pp. 80-112.

Aalst, W.M.P. V., "Making Work Flow: On the Application of Petri Nets to Business Process Management", Department of Technology Management, Eindhoven University of Technology, (2002), pp. 1-22.

Denti, Enrico et al., "LuCe: A Tuple-based Coordination Infrastructure for Prolog and Java Agents", Autonomous Agents and Multi-Agent Systems, 4, Kluwer Academic Publishers, (2001), pp. 138-141.

EPO, "Result of Consultation for EP Application No. 06017088.3", (Apr. 22, 2008).

Aalst, W.M.P. V., et al., "Workflow Patterns", Distributed and Parallel Databases, 14, 5-51, 2003 Kluwer Academic Publishers. Manufactured in the Netherlands., (2003), pp. 5-51.

"Non-Final Office Action received in U.S. Appl. No. 11/219,526 mailed on Jan. 8, 2009", 7 Pages.

Chaterjee, S. et al., "Messaging Patterns in Service-Oriented Architecture, Parts 1&2", Microsoft Architects Journal, Issues 2 and 3, (Apr. and Jul. 2004), 26 pgs.

Fielding, R. T., "Architectural Styles and the Design of Network-based Software Architectures", PhD thesis, University of California, Irvine, 2000, 180 pgs.

Hagen, Claus et al., "Exception Handling in Workflow Management Systems", IEEE Transactions on Software Engineering 26(10) (Oct. 2000), pp. 943-958.

"Non-Final Office Action in U.S. Appl. No. 11/218,933 mailed on Nov. 25, 2008", 20 Pages.

Kilgore, R et al., "Testing Distributed Programs Containing Racing Messages", The Computer Journal 1997 40 (8):489-498; doi:10.1093/comjnl/40.8.489, (1997), pp. 489-498.

Kumar, A. et al., "Workflow support for electronic commerce applications", Decision Support Systems 32:, (Jan. 2002),pp. 265-278.

"Non-Final Office Action received in U.S. Appl. No. 11/219,526 mailed on Apr. 10, 2008", 23 Pages.

"Non-Final Office Action received in U.S. Appl. No. 11/218,933 mailed on Jun. 4, 2007", 14 Pages.

"Final Office Action Received in U.S. Appl. No. 11/218,933 mailed on Nov. 15, 2007", 20 Pages.

"Advisory Action Received in U.S Appl. No. 11/218,933 mailed on Mar. 5, 2008", 4 Pages.

"Restriction and Election Requirement Action Received of U.S. Appl. No. 11/218,933 mailed on Jun. 27, 2008", 8 Pages.

Notice of Allowance for U.S. Appl. No. 11/218,933, mailed Aug. 2, 2010, 15 Pages.

* cited by examiner

DYNAMIC MESSAGE ROUTING

TECHNICAL FIELD

This description relates to dynamic message routing.

BACKGROUND

Modeling languages may be used as meta-languages to describe and execute underlying processes, such as business processes. For example, process modeling languages allow an enterprise to describe tasks of a process, and to automate performance of those tasks in a desired order to achieve a desired result. For instance, the enterprise may implement a number of business software applications, and process modeling may allow coordination of functionalities of these applications, including communications (e.g., messages) between the applications, to achieve a desired result. Further, such process modeling generally relies on language that is common to, and/or interoperable with, many types of software applications and/or development platforms. As a result, process modeling may be used to provide integration of business applications both within and across enterprise organizations.

One application of process modeling includes the routing of messages among a plurality of recipients. For example, a process model may specify that a message be sent to a first recipient, and then to any two other recipients prepared to receive the message in parallel, and then to a sequence of two or more other recipients. The process model may thus ensure the specified order, and may be updated as the message is sent and/or received by each of the recipients. Thus, using process models for routing messages may provide many of the benefits of process modeling in the message routing realm, such as, for example, the automation, flexibility, and reliability that are associated with process modeling.

SUMMARY

According to one general aspect, a routing order for routing a message among a group of recipients is determined. A sequence of the routing order is resolved to determine identity information for a subset of the group of recipients, and the sequence and the identity information are translated into a process model.

According to another general aspect, a system includes a routing manager for maintaining a routing order for routing a message among a group of recipients, the routing order including at least one sequence describing a subset of the group of recipients, wherein the routing manager is operable to resolve the sequence to determine identity information associated with the subset of the group of recipients. The system further includes an orchestration engine that is operable to execute a process model and thereby coordinate the routing of the message, based on the resolved sequence and the identity information.

According to another general aspect, a computer program product includes a signal-bearing medium bearing at least one of one or more instructions for executing a plurality of process models, each process model corresponding to a sequence of a routing order for routing a message among a group of recipients.

The details of one or more implementations are set forth in the accompanying drawings and the description below. Other features will be apparent from the description and drawings, and from the claims.

DETAILED DESCRIPTION

Figure 1:
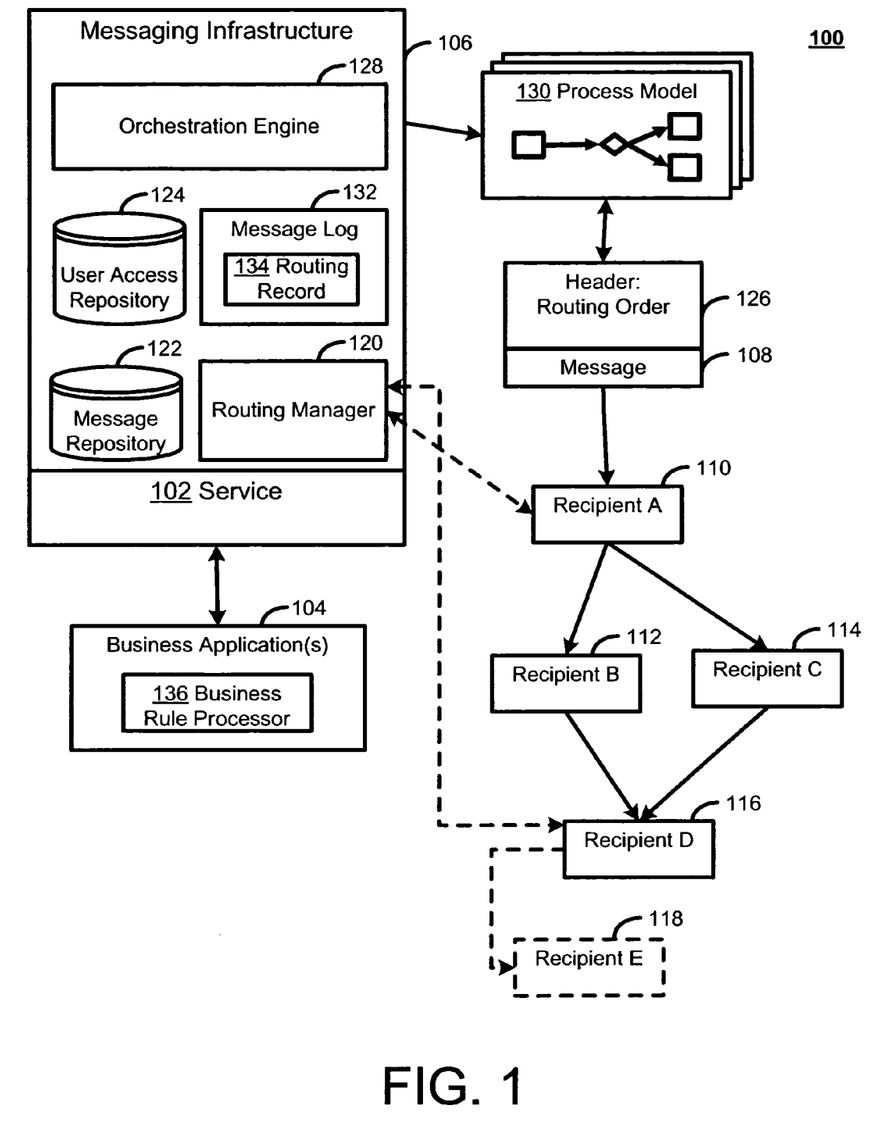
FIG. 1 is a block diagram of a system for dynamically routing messages through a series of service interactions.

FIG. 1 is a block diagram of a system 100 for dynamically routing messages through a series of service interactions. In the example of FIG. 1, the system 100 is operable to rout messages according to a routing order, where sequences (e.g., sub-sections or subsets) of the routing order are progressively and/or iteratively resolved during a run-time of the message routing operation(s). The resolution of a sequence may involve determining identity information of recipients that were previously only described within the sequence in relation to one another, in relation to the group, or in relation to a type of routing order. Further, the resolution(s) of the sequences may depend at least in part on responses received from recipients of the message during execution of earlier (resolved) sequences of the message routing operations. In this way, message routing may occur dynamically, so that, for example, new recipients may be added, or a (new) message order may otherwise be realized or implemented, during the run-time of the routing operation.

In the example of FIG. 1, a service 102 is illustrated that generally refers to an application having one or more specific functionalities that are exposed to other applications, often over a network (e.g., the Internet) by way of a service interface (where an operation and use of the interface may be known or determined, as needed). Although only a single service is illustrated, for the sake of clarity, it should be understood that multiple services may be represented by the service 102. When such a service(s) (and/or an interface of the service) is exposed/available over the World Wide Web (referred to herein as the WWW or the web), then the service 102 may be known as a web service. For example, the service 102 may provide virtually any functionality that may be provided by an application over a network, including, for instance, providing stock quotes, providing airline or other reservations, providing purchasing/invoicing functionalities, or providing some aspect of supply chain management or inventory control.

Although the above listing provides just a few general examples of functionalities that may be provided by services, it should be understood from the below description that the service 102, in FIG. 1, may be a service that generally implements and/or benefits from some type of routing or coordination of messages in conjunction with providing its associated functionality. For example, a legal case preparation/scheduling service may be implemented as the service 102 that is designed to schedule hearings or other court dates. Such a service, for example, may need to know an identity and availability of various parties (e.g., attorneys, judges, or expert witnesses), and may need to know a current status of the subject matter that is to be considered at the hearing or other court date (e.g., a paper or other evidence required by the judge from one of the other parties).

It should be apparent that the service 102 may schedule a hearing of certain involved parties, and yet if the subject matter is not ripe or ready for review, or if an important party (who should therefore attend) is not mandated to attend, then the time of the other parties who arrive at the hearing may be wasted, and the hearing may have to be re-scheduled. As described herein, the system 100 seeks to avoid such results, e.g., by dynamically routing the scheduling messages such that important parties are contacted (even if not originally specified in an initial routing order), and a status of any required material is known, determined, and/or updated prior to an actual scheduling of a hearing.

Such a scheduling service may be related to, but separated from, an underlying application 104, which is shown in the example of FIG. 1 as a business application. In this regard, the term business application should be interpreted generally and broadly as including any application that is used in profit generation of some sort, although the business application 104 also may refer to non-profit endeavors as well, including the legal system example above, but also including schools, churches, charities, hospitals, or virtually any other organization. Further, the business application 104 is merely an example, and other applications, such as applications for personal use, also may be used.

As such, the business application 104 includes or is associated with various rules, data, parties, or other parameters that are particular to a certain business application. For example, if the business application 104 represents a supply chain management (SCM) application, then various types of information may be available and manipulated with reference to manufacturers, warehouses, wholesalers, or retailers. In contrast, of course, when the business application 104 is associated with the legal system example above, then the business application 104 may contain rules or other information about types of court hearings, descriptions of parties involved in the various types of court hearings, or other information that may be useful in that context.

Meanwhile, the service 102 may provide scheduling functionality that may be relevant to, and useful for, the above examples, or any other of a number of types of business applications. In this way, the functionality of the application may be separate from, but complementary to, the functionality of the service 102, or, put another way, the service 102 may be used with a plurality of different types of the business application 104.

In particular, for example, the service 102 may interact or otherwise be associated with a messaging infrastructure 106. The messaging infrastructure 106 may be used to route a message 108 among a plurality of recipients 110, 112, 114, 116, and 118. In the following description, the recipients 110, 112, 114, 116, and 118 may be referred to as recipient A, recipient B, recipient C, recipient D, or recipient E, respectively, or simply as A, B, C, D, or E, also respectively.

In order to route the message 108 dynamically between and among the recipients 110-118, and possibly other recipients, a routing manager 120 may be used within the messaging infrastructure 106. For example, the business application 104 may cause or experience an event that initiates a set of dynamically-routed service interactions between the service 102 and the recipients 110-118, which also may each represent services. For example, in the legal system example above, the business application 104 may receive an instruction from a court clerk or administrator regarding a certain type of hearing, and the business application 104 may determine that the recipients 110-116 (recipients A, B, C, D) should receive the message 108, provide additional information in response, and, ultimately, attend the hearing. The business application 104 also may specify information about a routing order in which the recipients 110-116 should receive the message 108.

In response, the routing manager 120 obtains the routing order and addressing information from the business application 104, by way of the service 102. For example, the routing manager 120 may determine that a routing order may be specified over and including the list A, B, C, D of recipients, and specified in the corresponding routing order in a semi-structured manner that describes at least some of the recipients, without necessarily identifying the recipients by name or other unique identifier. For example, a routing order may specify that the message 108 should be routed to recipient A 110 first, and then in parallel to two of the remaining recipients 112, 114, or 116, and then to a remaining recipient. Such a routing order may generally be specified as: "Over ABCD: A(par two)remaining," which, again, represents that "over the list ABCD, send to A first; then in parallel to two of B, C, D; and then to the remaining recipient."

Such a routing order may be said to include a plurality of sequences (or subsets or sub-sections), which, in this case, include a first sequence "A," a second sequence "(par two)," and a third sequence "remaining." As may be seen, the first sequence "A" in this example provides identity information about a recipient by explicitly naming the recipient A 110. The second sequence "(par two)" merely describes two of the other recipients with reference, e.g., to their relation to one another in receiving the message 108 (i.e., a parallel relationship), but does not provide actual identity information about the two referenced recipients. Similarly the third sequence "remaining" merely describes a recipient with reference to a remainder of the group ABCD, after the other three members of the group have received the message. As referenced above and described in more detail below, a sequence that describes (but does not identify explicitly) one or more of the recipients 110-116, may need to be resolved to determine corresponding identity information. For example, the routing order comprising the sequences may be processed and considered in an iterative or progressive manner, such that each semi-structured, unresolved, and/or descriptive sequence is considered in turn once the previous sequence has been resolved and/or executed.

In one implementation, then, a recipient reply received as part of an execution of a prior sequence may be used to resolve a subsequent sequence, and to obtain identity information for that sequence. In the example routing order above, for example, if the message goes first to the recipient A 110, then a response from the recipient A may be used to determine that the message should next go to the recipient B 112 and the recipient C 114 in parallel. In other words, the unresolved, descriptive sequence "(par two)" would be resolved to express the sequence with determined identity information as "(par B, C)." Then, it may be seen that the remaining recipient of the group ABCD is the recipient D 116, so that the third sequence "remaining" may be resolved and expressed with identity information "D." In sum, then, the routing order with unresolved sequences "Over ABCD: A (par two)(remaining)" may have the unresolved sequences resolved, at least in part based on the recipient response from the recipient A 110, and expressed with identity information as "Over ABCD: A (par B, C)(remaining)".

Based on these examples, and on the discussion below, it should be understood that the unresolved sequences of the routing order may not generally be resolved until during a run-time of the message routing operation(s). For example, the recipient response from the recipient A 110, which is determined during run-time of the message routing operations, is used to resolve the sequence "(par two)" for expression with identity information as "(par B, C)." However, if the recipient response from the recipient A 110 had been different, then the unresolved sequence "(par two)" may have been resolved differently, e.g., as "(par B, D)" or as "(par C, D)."

Thus, the routing manager 120 may determine both the routing order for the message 108, as well as the content (or other aspect) of the message 108. For example, upon the initiation of the service 102 and/or the business application 104, the routing manager may assemble the message 108 from a message repository 122. The message repository 122 may store, for example, message types, message templates, previous messages, message portions that may be assembled into a single message, or other message-relevant information. For example, messages may be constructed using the eXtensible Mark-up Language (XML), according to message type/ template information provided in corresponding XML schemas. Contents of the message repository 122 may initially be constructed or determined using information from the service 102 and/or the business application 104.

When constructing the routing order and the message 108, the routing manager 120 also may access a user access repository 124. The user access repository 124 may store a list of all possible or known recipients, including addressing information that may be needed to appropriately route the message 108 to a desired recipient. The user access repository 124 also may store user access/permission levels for performing certain actions. For example, permission may be required for one of the recipients 110-118 to receive a certain message or message type. Also, as described in more detail below, permission may be required before one of the recipients 110-118 is allowed to perform certain actions with regard to the routing order, e.g., to update the routing order to include a new, previously-unspecified recipient.

The routing manager 120 may thus construct the message 108, including a (message) header 126. The routing order may be included in the header 126, as shown. Other information, including, for example, user access/permission level(s), also may be included. Thus, in the described implementation, recipients 110-118 of the message 108 may be provided with at least some information about the past or future recipients (e.g., by virtue of the included routing order in the header 126), as well as about access and/or permission levels of those recipients to perform certain actions (e.g., to update or change the routing order).

Once the routing order is specified as including at least one unresolved sequence, then the routing manager 120 may provide at least a first sequence of the routing order to an orchestration engine 128. For example, the routing manager 120 may translate the first sequence into a process model 130 that is executable by the orchestration engine 128. As referenced above, such process models generally include a plurality of nodes or tasks that are joined and ordered to obtain a desired result. That is, as illustrated by the example process model 130 illustrated in FIG. 1 (which is intended merely as a conceptualization or illustration of a process model, and not intended necessarily to represent a particular process model being executed in FIG. 1), nodes/tasks may be joined by appropriate edges (arrows) and control tasks (e.g., splits and/ or joins) to obtain structures including parallel tasks, iterative tasks, nested loops, or other known task progressions. As such, a differentiation may be made in the example of FIG. 1, between the routing manager 120, which manages an order of routing, and the orchestration engine 128, which performs an actual coordination of message routing among the recipients 110-118.

The orchestration engine 128 thus represents an engine for executing such process models, and, as such, is operable, for example, to track a state of the process model (e.g., which tasks have been completed, including a most-recently completed task), update the process model in response to a completed task, and ensure that an order of the process model is followed. Languages exist that may be used to specify the process model 130 for execution by the orchestration engine 128. For example, the Business Process Execution Language (BPEL) is designed to implement process models that rely on services to realize process tasks. Thus, in one example implementation, BPEL or other such languages, or modifications/ extensions thereof, may be used to define and execute the process model 130.

The process model 130 is thus deployed, and, in the example being discussed, executes the first sequence of the above-described routing order, which, in this case, is merely the command to forward the message to the recipient A 110 (i.e., to execute the sequence "A"). As a result, the message 108 and the header 126 are forwarded to the recipient A 110.

Deployment of the message 108 in this manner is reflected and recorded in a message log 132, and, more specifically, may be recorded in a routing record 134. That is, the message log 132 tracks messages of the system 100, including, for example, when the messages are sent or received (e.g., by assigning or associating a corresponding time-stamp), by/to whom the messages were sent, and other information useful in tracking a state of the routing operations. More generally, the routing record 134 may be organized for a particular routing order in terms of which sequence(s) have been resolved and/or executed/executing, and may track which sequence(s) are as yet unresolved and therefore not yet executing. Thus, the routing record 134 is generally particular to the routing order of the example being discussed, although naturally the message log 132 may contain many routing records corresponding to many routing orders that may be in the process of resolution/execution by the messaging infrastructure 106.

As illustrated in FIG. 1, the recipient A 110 may be in communication with the routing manager 120, in order, for example, to communicate a response or action taken after receiving the message 108. For example, the recipient A 110 may receive the message 108, update the message 108 with required information, and then alert the routing manager 120 that these steps have been taken. In this way, the routing manager 120 may take several actions. For example, the routing manager 120 may update the routing record 130 to reflect the information received from the recipient A 110.

As another example, the routing manager 120 may use the information provided by the recipient A 110 (including the content of any update or modification of the message 108 provided by the recipient A 110) to resolve the subsequence sequence(s) of the routing order. For instance, continuing the above example, the routing manager 120 may receive the response from the recipient A 110, and may determine, based thereon, that the next-subsequent sequence "(par two)" should be resolved as "(par B, C)." For example, in the legal system example above, the recipient A 110 may represent a service associated with a prosecution attorney, which may specify that comments from certain expert witnesses are required.

The business application 104 may be responsible for the knowledge of how to resolve a given sequence based on a recipient response, particularly when based on a content of the updated message. For example, in the present case, it is the business application 104 that, as already explained, contains information that is specific to the legal system example, such as court proceedings, involved (types of) parties, and other court-specific information.

Such application-specific information may be captured and expressed as a set of rules, so that input from the recipient response may be analyzed and an output that includes a next-required recipient may be produced, and a subsequent sequence of the routing order may be resolved. Thus, the business application 104 may contain a business rule processor 136 that receives the message from the routing manager 120 and analyzes the message to determine who the next recipient(s) should be. In the present example, then, the routing manager 120 may pass the recipient response from the recipient A 110 to the business rule processor 136, which may analyze the response to resolve the sequence "(par two)" into the resolved sequence with identity information of "(par B, C)."

Then, this now-resolved sequence "(par B, C)" may be reflected in the (updated) routing order, and may be translated into a process model and provided to the orchestration engine 128 for execution thereof. Execution of this process model results in a passing of the message 108 to the recipient B 112 and the recipient C 114 in parallel, for comment thereon by the respective recipients. Although not shown in FIG. 1 for the sake of clarity, it should be understood that the recipient B 112 and the recipient C 114 may be in communication with the routing manager 120, in order to allow the routing manager 120 to update the routing record 134.

Further, such communications may be useful or necessary in resolving a next sequence of the routing order. In the present example, however, information from the recipient response from the recipient A 110 is sufficient to resolve the sequence "remaining," which, by process of elimination of earlier recipients A, B, C, must be the recipient D 116. Thus, the resolved sequence "D" is transformed into a process model for execution thereof by the orchestration engine 128.

Although forwarding the message to the recipient D 116 may result in an end of the message routing example being discussed, it is also true that the iterative, progressive nature of the operation of the routing manager 120 in resolving sequences to obtain identity information allows even further flexibility. For example, the original routing order may be allowed to grow or add recipients during the routing operations. In this case, the original routing order may be expressed as "Over ABCD*: A(par two)(remaining)," where the "*" indicates the ability of the list of recipients to grow, so that, for example, the "(remaining)" sequence may include and/or be followed by at least one other recipient.

In such a case, for example, it may be that the above-described routing order of "A(par B, C)(D)" ostensibly completes when the recipient D 116 received the message, provides an update, and then forwards the updated message to the routing manager 120. However, it may be that in this example the recipient D 116 is allowed by the user access repository 124 to update the routing order by adding a new recipient when necessary. For example, the recipient D 116 may determine that input from the recipient E 118 is required to properly complete the routing of the message 108. It should be understood that in many cases the issue of whether to include the recipient E 118 may not be known until a run-time of the routing operation(s), and, further, the identity of the recipient E 118 may not be known until run-time. In such situations, the recipient E 118 may not be properly specified during a design time of the process model 130, or similar process model.

Instead, in the example of FIG. 1, the recipient D 116 may request that the message 108 be passed to a certain party having a certain qualification, and may or may not specify a particular individual. For example, in the legal system example above, the recipient D 116 may specify that a government official from a specified governmental department be present at a certain hearing, depending on some information learned during the update of the message 108 by the recipient B 112.

In this case, the routing manager 120 may pass the updated message (or an associated event) to the business rule processor 126. The business rule processor 136 may then analyze the message and/or event and determine, e.g., the required governmental department, and at least one service (i.e., the recipient E 118) in the governmental department that may properly be contacted in this situation.

Then, just as described above, the recipient E 118 may be passed to the routing manager 120 to be included in a resolved sequence, which may be translated into a process model, which may then be deployed for execution within the orchestration engine 128. In this way, the recipient E 118 may receive the message 108, even though the recipient E 118 was not specified in the original routing order, and, in some cases, may not even have been known to the business application 104 until after the original routing order already had been formulated and/or deployed.

Figure 2:
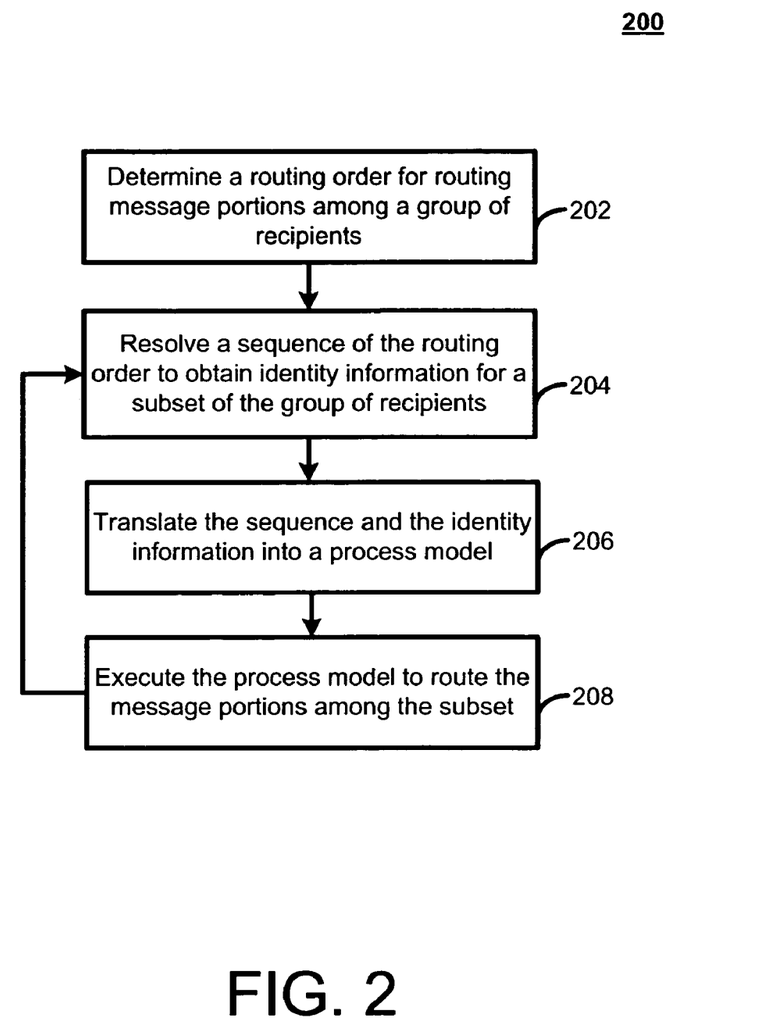
FIG. 2 is a flowchart illustrating an operation of the system of FIG. 1.

FIG. 2 is a flowchart 200 illustrating an operation of the system of FIG. 1. In FIG. 2, a routing order for routing message portions among a group of recipients is determined (202). For example, the routing order mentioned above of "over ABCD: A(par two)remaining" may be determined based on some event triggered by the business application 104, or by a user of the system 100. This routing order may then be applied to the message 108, as described, or, as referenced in FIG. 2, may be applied to portions or fragments of the message 108 that are determined to be specific to an individual recipient. For example, a first portion of the message 108 may be associated with (and ultimately routed to) the recipient A 110, and may be specifically required to be updated by the recipient A 110, while a second portion of the message 108 may be associated with (and routed to) both of the recipient B 112 and the recipient C 114. Then, for example, all of the first portion and second portion(s) may be routed to the recipient D 116, or, in another example, a third portion of the message 108 may be routed to the recipient D 116. Thus, it should be understood that the term message as used herein may refer to a single message, or to one or more message portions. The message portions may be tracked through the routing manager 120, the routing record 132, and/or the message repository 122.

Although a small number of examples of routing orders are provided above, it should be understood that many different types of routing orders, containing many different types of resolved and/or unresolved sequences, may be constructed. Examples are provided below with an example syntax that is not intended to represent a particular example of an actual language to be used by the routing manager 120. Rather, a number of such languages may be constructed and used for specifying the routing order(s) in a manner that is supported by the routing manager 120, interoperable with the service 102 and the business application 104, and easily translatable into BPEL or other language that may be executed by the orchestration engine 128. Further, examples below are given with respect to the five recipients 110-118 of FIG. 1; however, the concepts and example syntax will be recognizable as being extendable to virtually any number of recipients.

In a first example, a routing order may be specified as "Over ABCD*: A(par two)(seq remaining)." This routing order is similar to the example above in which the "*" symbol represents an ability of the routing order to extend beyond the specified recipients 110-116, e.g., to include the recipient E 118, but in which it is specified that the remaining (in this case) two recipients must be executed in sequence with one another (e.g., as opposed to in parallel with one another).

In a next example, a routing order may be specified as "Over ABCD: (next)(par others)." In this case, as above, the sequence "A" is executed as a first instance of the "next" sequence, followed by the sequence "(par others)," which would be resolved as "(par B, C, D)." Then, the next sequence would be resolved as "B" (which is "next" after A), so that in this iteration the "(par others)" would be resolved as "(par A, C, D)." This would continue with the "next" sequence being resolved as "C," followed by "(par A, B, D)," and, finally, with the "next" sequence being resolved as "D," followed by a resolving of the "(par others)" sequence as "(par A, B, C)." For example, the recipients 110-116 may be services that are used to evaluate a document, so that the present example allows one service to evaluate a document and allows the other services to comment on the evaluation. In this example, each recipient service is allowed an opportunity to make an evaluation, to have that evaluation receive comments, and to comment on comments of the other recipient services.

A similar example may include a routing order "Over ABCD: (next)(par remaining), in which similar iterations occur, but only for remaining ones of the recipients 110-116. For example, resolved sequences may include "A (par B, C, D)," "B(par C, D)," and perhaps "(C)(D)."

As referenced above, a sequence may be included for which identity information is dynamically-determined during run-time of the process model 130, based, for example, on a recipient response as interpreted by the business rule processor 136. To provide an associated nomenclature and syntax for such concept(s), the term "dyn-next" is used to designate any such sequence.

Accordingly, any of the above sequences may be implemented using a "dyn-next" sequence. For example, sequences may be defined such as "Over ABCD: dyn-next (par remaining)," or "Over ABCD: dyn-next (par others)," or "Over ABCD*: dyn-next (par remaining)." More detailed examples and explanations of these and/or similar examples are provided herein.

Once the sequences of the routing order are determined, a (first) sequence may be resolved to obtain identity information for a subset of the group of recipients (204). For example, where the group of recipients initially includes the recipients 110-116, a sequence such as "dyn-next" or "(par two) may be resolved to obtain identity information such as "recipient A," or "(par B, C)," respectively. Of course, it should be understood that in any given sequence, but particularly with respect to the first sequence, identity information of a recipient may be specified or designated prior to run-time, and, e.g., included explicitly within the routing order. For example, the recipient A 110 may simply be designated as a first recipient, since, generally (but not always) a first recipient may be the easiest recipient to identify at design-time of the routing order.

As referenced above, the resolving of a sequence may be based on a recipient response obtained from an earlier, resolved and executed sequence. More generally, the resolving of a sequence may be determined on any criteria that may be determined or decided by the business rule processor 136. For example, a sequence "dyn-next" may be resolved based on an operation of the business rule processor 136 that dynamically determines which of the available recipients is best-suited to provide an update of the message 108. Of course, a determination of "best" may vary depending on circumstance, but may include, for example, a most-available recipient, a recipient that has provided the most or the most-preferred updates in the past, or some other criteria. Thus, identity information specifying the sequence "dyn-next" as, e.g., one of the recipients 110-116, may be determined.

Once resolved, the sequence and the identity information may be translated into a process model (206). For example, the routing manager 120 may provide such a translation, including, e.g., appropriate process model constructs such as splits/joins, branches, iterations, nested loops, or other structures known from the field of process models. The routing manager 120 may then provide the resulting process model to the orchestration engine 128.

Accordingly, the process model may be executed, so as to route the message portions among the subset of the group of the recipients specified by the particular sequence being processed (208). For example, the orchestration engine 128 may direct and implement the process model 130 so as to accurately track the message 108 between and among the appropriate subset of the group of the recipients 110-116.

Then, the flowchart 200 may continue with a progression to resolving a next sequence of the routing order (204). As should be apparent, information obtained from the execution of the prior process model, such as one or more recipient responses, may be included during the operation of resolving the next sequence.

Figure 3:
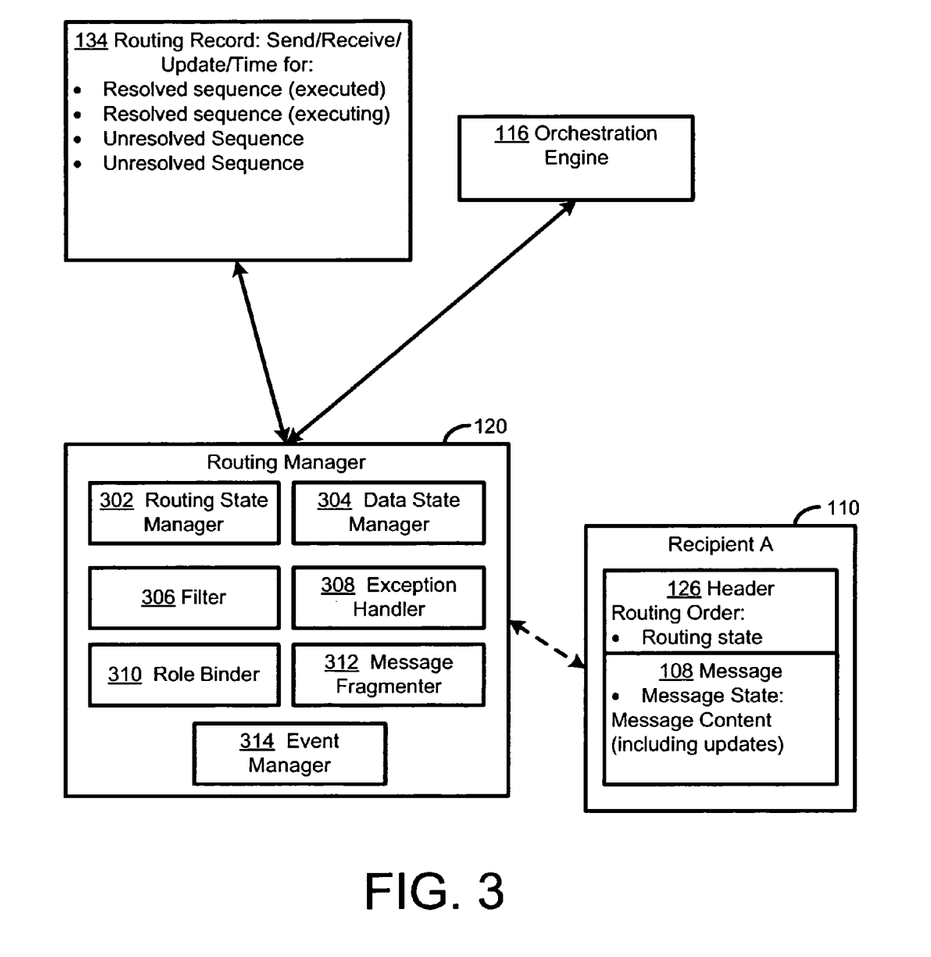
FIG. 3 is a block diagram illustrating specific examples of elements of the system of FIG. 1.

FIG. 3 a block diagram illustrating specific examples of elements of the system 100 of FIG. 1. In the example of FIG. 3, the routing manager 120 is illustrated as including a number of additional components. For example, the routing manager 120 is illustrated as including a routing state manager 302. As referenced above, routing order may depend on what message(s) have been received from the recipients 110-118, as well as on the content of the message(s). Thus, a routing state may be maintained separately and independently from message content state, which, instead, may be maintained in association with a data state manager 304. For example, a routing state may be used to define events that sit over message content and which may impact the routing order, e.g., based on interaction with, and a decision of the business rule processor 136. Further, although the routing state is illustrated in FIG. 3 as being managed at the routing manager 120, it should be understood that routing state may be maintained at a location of a particular one of the recipients 110-118, e.g., at one of the recipients that may be considered to be pivotal to the routing order or to a particular sequence thereof.

The routing state manager 302 may thus be responsible for a number of duties, including, for example, updating the routing record 134 and/or updating the header 126 to reflect a current routing state of the message 108 (and/or of portions thereof). For example, as shown in the routing record 134 of FIG. 3, information may be maintained for each message and/or sequence describing a sender and/or receiver of the message(s), what updated information was included in the message(s), and at what times the message(s) were sent and/or received. Further, information as to which sequence(s) have been resolved and executed, or resolved and currently executing, or unresolved, may be maintained in the routing record. By maintaining similar information in the header 126, the recipients 110-118 may be kept aware of past, present, and future routing information. Of course, in some implementations, such routing state information may be partially or wholly hidden from one or more of the recipients 110-118.

The routing state manager 302 also may interact with the business application 104, as described, to determine any application-specific determination useful in resolving a sequence of the routing order. For example, the routing state manager 302 may be involved in receiving an updated message from, e.g., the recipient A 110, and may determine that this updated message should be forwarded to the business application 104.

In the latter regard, a filter 306 may be included that removes any extraneous information from the message in question before forwarding to the business application 104.

For example, the filter 306 may remove the header 126 from message 108, as information from the header 108 may not be useful to, or interpretable by, the business application 104.

An exception handler 308 may be included that is useful in managing difficulties encountered in implementing the system 100. For example, in a routing order specified as "Over ABCD: dyn-next (par others)," it may be the case that the message 108 may be locked into a situation in which the routing order may never be completed. For example, if the sequence "dyn-next" is initially evaluated as "A," then the recipient A 110 will be allowed to update the message 108. Then, the sequence "(par others)" may be resolved as "(par B, C, D)." Once this sequence is executed, then a next dynamically-determined recipient may be determined. However, if it occurs that this next recipient is again the recipient A 110, then it may be seen that such iterations may continue indefinitely. Accordingly, the exception handler 308 may, for example, execute a stop condition that halts a given routing order, e.g., after a certain amount of time, and/or after a certain number of iterations.

Yet further features and implementations of the routing manager 120 may include a role binder 310. The role binder 310 refers to an ability of the routing manager 120 to "late-bind" a role specified in a routing order to a particular recipient. For example, late-binding refers to a situation in which the recipient A 110 is a service associated with a role, such as "government official from department X," or "transportation lawyer," or "professor," or "reviewer," or virtually any other type of position or generic designation. Any such role may be bound by the role binder 310 to a particular instance of the role. For example, the examples just given may be bound to corresponding service(s) associated with a particular individual who is known (e.g., by the business application 104) to fulfill the role in question. In this way, a routing order may obtain an additional layer of abstraction. Accordingly, it may be easier to define such a routing order, since specific knowledge of particular parties required to define the routing order may be limited.

Such late-binding should be distinguished from the resolving of the sequences already described. For example, in a case of the routing order "Over ABCD: A (par two)(remaining)," the recipients 110-116 may be specified as roles, rather than as specific entities. Thus, even after the sequences are resolved, for example, into "A," "(par B, C)," and "D," there is an opportunity to late-bind these roles into specific services/entities. Similarly, though, and as referenced above, determination of late-binding may be made with or by the business rule processor 136.

In FIG. 3, a message fragmenter 312 is illustrated that, as referenced above, may be used to fragment the message 108. In this way, only relevant portions of the message 108 need be routed to corresponding ones of the recipients 110-116.

As described above with respect to FIGS. 1-2, one technique by which a sequence of a routing order may be resolved involves processing of an event by the business rule processor 136 of the business application 104. That is, for example, an event may be generated by a business application associated with the recipient A 110, and/or processed by a service associated with the recipient A 110 (in other words, applications or services analogous to the business application 104 and the service 102). As described, interpretation of such an event by the business rule processor 136 may be factored into a resolving of the next sequence of a routing order. For example, in the example routing order above of "Over ABCD: A(par two) remaining," such an event at the recipient A 110 may be instrumental in resolving the "(par two)" sequence as "par B, C." In other examples, interpretation of such an event may allow routing of the message 108 to a new recipient not specified in the original routing order (where allowed by the routing order).

As also described above, such events may be received at the routing manager 120, but may be passed to the business rule processor 136 for actual interpretation thereof with respect to any possible effect on the routing order. In this way, application-specific logic or information may be used to interpret the events (such as in the legal system example above where the business application 104 is presumed to have particular knowledge about legal proceedings or participants), while the routing manager 120 (or, more generally, the messaging infrastructure 106 and/or the service 102) may be used generically with a plurality of (types of) business applications besides the particular business application 104.

In explaining and expanding on these concepts of de-coupling the routing manager 120 from the business rule processor 136, events may be reflected at a level of the service 102. In other words, in the system 100 of FIG. 1, events emanating from included or related business applications (e.g., the business application 104 and/or business applications associated with the recipients 110-118, not explicitly shown in FIG. 1) may be exposed through interfaces of services associated with the business application(s) (e.g., the service 102). Such exposure allows events of virtually any type(s) to be handled by the respective business applications, including, for example, events related to routing, process orchestration, service composition, or consumption within other services. In this way, business application events may be responded to in a manner that is decoupled from the business application 104 itself.

Moreover, inbound/outbound events may be specified as part of a given service interface, so that, for example, interfaces of service(s) may define which events are consumed by the service(s). For example, a publish-subscribe mechanism may be used to specify events according to some pre-defined criteria. For example, a business application associated with the recipient E 118 may publish an event that is detected by the service 102 (assuming the service 102 is a subscriber for such an event). An effect of the published event may be that the recipient E 118 becomes the best-suited recipient for the message 108, and may thus receive the message 108 even though the recipient E 118 may not have been known at a design time of the routing order, and even though run-time of the routing order has already begun. Thus, events occurring anywhere within the system 100, and/or in related systems or application, may impact a given service.

Finally in FIG. 3, an event manager 314 is illustrated as an example of an implementation technique for an additional or alternative decoupling between the messaging infrastructure 106, the service 102, and/or the business application 104, beyond that just described. For example, the event manager 314 may provide event mediation between the routing manager 120 and the underlying service(s) 102, so as to allow relating of a routing order (and its sequences) to events that may occur in the system 100.

For example, events may be described against the routing order, in order to allow resolving of a sequence of the routing order to be based on corresponding events in the underlying services/applications, and/or on responses from the recipients 110-116. In other words, events (referred to as "routing events") may be used at the routing manager 120 that correlate, and may be mapped to, underlying service events. The routing events may thus be mapped to the underlying service events, or to events related to actions of the routing manager 120. Once such mapped events are registered with the event manager 314, the event manager 314 assumes responsibility for correlating the routing events with events occurring within underlying resources, e.g., occurring within routing manager(s) and/or underlying service(s) of the system 100.

By using the event manager 314 in this manner, events may be captured in mechanisms convenient to different resources (i.e., different routing managers or services), while leaving the events free to execute in normal fashion. Further, events may be produced and consumed with minimal event tracking overhead, and without dependence on different event formalisms that may be used by the different resources.

Events correlated to a routing order sequence may be mediated through the event manager 314 to the underlying service 102. In this way, and as already described, events may be captured against the recipients 110-118 (allowing dynamic change to the list of recipients, based on the events), and may be captured against routing order sequences (including substitution of functions expressed in the routing order, again based on the events).

For example, the routing manager 120 may issue message updates to relevant services (and business applications) associated with the recipients 110-116. Events at the service level (e.g., at a service associated with the recipient B 112) may expose data identifying problems raised by the previous recipient (e.g., the recipient A 110). For example, in an insurance investigation, audit, or similar investigation, an insurance fraud may be detected based on the previous stage (i.e., recipient) of subject matter investigation, and a corresponding event may be generated (e.g., published). At the routing manager 120, such an event may be translated into a decision about resolving the next routing order sequence, e.g., a decision about which next two recipients to chose. In the original routing order, such an event may be mapped into different service events resulting from the last sequence of routing. The event manager 314, as described above, correlates for the routing manager 120 the event "which next two recipients to chose" with the different service level events possible for that particular sequence. Accordingly, "insurance fraud" detection may be related with an insurance attorney role, and further rules could be specified as to which instance of that role to chose.

Thus, an event attached to (associated with) the next routing sequence may await resolution, based, e.g., on corresponding events in the interfaces of relevant services. Resolving the event against the sequence allows the routing manager 120 to materialize the sequence(s) into a more concrete form, for execution thereof by the orchestration engine 128, as described herein.

Although FIG. 3 illustrates a number of examples of components that may be included in the routing manager 120, it should be understood that many other components also may be included, including components corresponding to various functionalities already described. For example, components for determining an authorization of a recipient to update a routing order (i.e., by interacting with the user access repository 124) may be included. Additionally, components for translating a resolved sequence into a process model for execution by the orchestration engine 128 also may be included.

Figure 4:
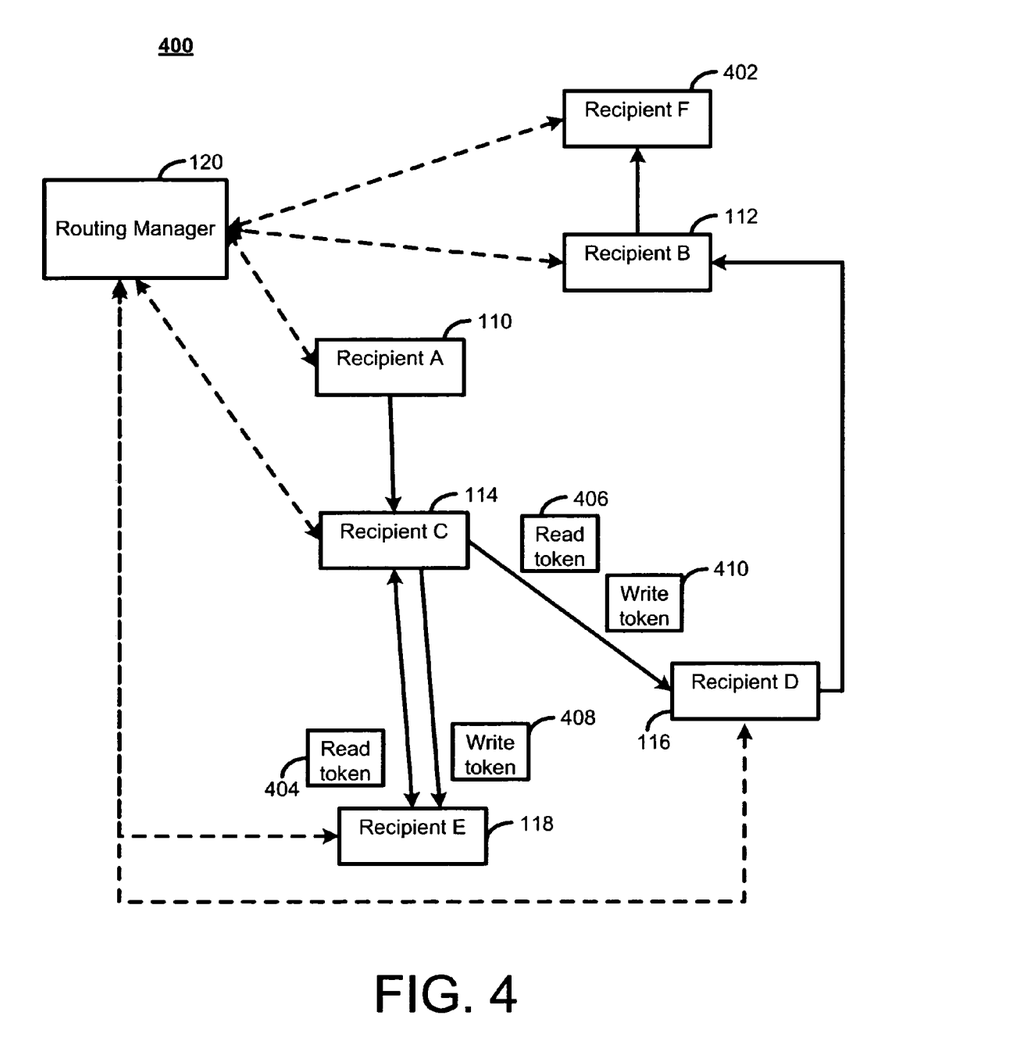
FIG. 4 is a block diagram of a portion of the system 100 of FIG. 1 during an execution of an example routing order.

FIG. 4 is a block diagram 400 of a portion of the system 100 of FIG. 1 during an execution of an example routing order. In the example of FIG. 4, the routing manager 120 is illustrated as managing a dynamic routing for the recipients 110-118, as well as for an additional recipient, a recipient F 402.

In FIG. 4, a routing order is illustrated that includes "interleaved-parallel routing" (abbreviated consistently with the syntax above as "(int-par).") According to such a (sequence of a) routing order, a message will be sent as a read-only message to (or identified for) at least two recipients. Then, one of the recipients, usually, a first one of the recipients to respond, may be given write permission for updating the message. In other words, an "(int-par)" sequence proceeds similarly to a normal parallel routing; however, rather than each of the parallel recipients being allowed to modify the message, only one of the recipients is permitted to update the message. Then, for example, the other recipient(s) in the "(int-par)" sequence may receive the message in turn, for any additional comment.

It should be understood that any of the above-described sequences/routing orders, and others, may be implemented using the "(int-par)" sequence. For example, routing orders may be defined such as, "Over ABCD: A(int-par two)remaining," or "Over ABCD: A(int-par two)seq remaining," or "Over ABCD: next(int-par two) others," or "Over ABCD: next(int-par two) remaining," or "Over ABCD: dyn-next(int-par remaining)," or "Over ABCD: dyn-next (int-par others)," or "Over ABCD*: A (int-par two) others," and so on, where a meaning and use of the syntax of these examples should be apparent from the corresponding examples provided above.

Thus, in FIG. 4, a routing order is defined as "Over ABCDE*: A(dyn-next)(int-par remaining)." Accordingly, the first sequence "A" may be expressed as a process model and executed, so that a message (not shown in FIG. 4) may be updated by the recipient 110, and the routing manager 120 may be aware of such an update (based on a response from the recipient 110). Then, the sequence "(dyn-next)" may be resolved by, for example, passing the message to the business rule processor 136, which may apply some condition to dynamically determine that the next recipient should be the recipient C 114, since, for example, the recipient C best-meets some criteria of the business application 104. In this case, then, the message would not go to the recipient B 112, but would go instead to the recipient C 114.

Additionally, it should be understood that the criteria of the business application 104 may change over time, so that, for example, if the routing order were applied at a different time, or if the business rule processor 136 were executing a different set of rules, then identity information for the "(dyn-next)" sequence may turn out to be different in one setting or situation than in another. Moreover, for example, a user may effectively have an opportunity to modify the routing order during run-time (e.g., during execution of a process model of a resolved sequence) by modifying a rule of the business rule processor 136, or by adding a new recipient to be considered for matching whatever "dyn-next" criteria is in place (since, in this example, the "*" symbol is included to signify, as above, that new recipients may dynamically added to the routing order).

For example, the service 102 and the business application 104 may be associated with an airlines reward program, so that messages may be passed to services associated with tracking and using a user's airline frequent flyer miles. A dynamic condition may be in place that in certain routing settings/scenarios, "(dyn-next)" may be evaluated against recipients having a highest number of frequent flyer miles. However, such a dynamic condition may be changed, even during execution of a routing order/process model, so that a next-evaluated "(dyn-next)" sequence is evaluated against some different criteria, e.g., against a dual criteria of recipients having the most frequent-flyer miles and who also fly business-class or first-class the most frequently.

Continuing the example of FIG. 4, then, the recipient C 114 is resolved from the "(dyn-next)" sequence, so that, after the recipient C 114 receives the message, the following sequence of "(int-par remaining)" is reached. Accordingly, in FIG. 4, the recipient C 114 begins to execute an interleaved parallel routing between the remaining recipients, recipient D 116 and the recipient E 118.

Specifically, the recipient C 114 sends a read token 404 and a read token 406 to the recipient E 118 and the recipient D 116, respectively. Such a read token may signify, for example, that the message (or portion thereof) being routed is available from the routing manager 120 and/or the previous recipient(s), but that a recipient of the read token 406 may not be allowed, upon mere receipt of the read token 404/406, to modify or update the message being routed.

Then, the recipient E may request permission to be the next recipient to receive the message for consideration and/or modification thereof. Accordingly, the recipient C 114 sends back a write token 408, so that the recipient E 118 thus gains permission to be the first of the recipients E and D to update the message being routed. Then, the recipient D 116 may later be provided with a write token 410 (e.g., either from the recipient C 114, or from the routing manager 120, or from the business application 106) for making subsequent modifications or updates.

At this point, the routing order would ostensibly end. However, since the original routing order included the "*" designator and is allowed to grow beyond the original list or group A, B, C, D, it may be the case, as shown in FIG. 4, that the recipient D 116 may request an update to the routing order by which the message may be sent to the recipient B 112. For example, the recipient D 116 may specify explicitly that the message should be sent to the recipient B 112, so that, if the recipient D 116 is determined to have authorization to make such a request, then the message may in fact be forwarded to the recipient B 112. In another example, the recipient D 116 may simply request that the message be forwarded to a most-qualified recipient to comment thereon, and the routing manager 120 may forward the message to the business rule processor 136 to make the determination of the most-qualified recipient, based on some relevant criteria.

Still further, the recipient B 112 also may designate yet another recipient, e.g., the recipient F 402, to receive the message. For example, the recipient F 402 may represent a party who was not even known to the service 102 and/or the business application 104 at a time of an initial construction of the routing order, e.g., may represent a service that subscribed to be included on a list of recipients only after a resolving/translating/execution of the routing order had already commenced. In another example, the recipient F 402 may represent a party that is actively determined by the recipient B 112 or other recipient, during the routing process itself, to be required or beneficial in updating the message. For example, continuing the legal system example, above, the recipient B 112 may be associated with an expert witness who reviews a current state of evidence, including updates provided by the recipient D 116 and other earlier recipients, and indicates that a second expert witness is needed. Since such a determination may be made on the updates of earlier recipients (or on other information not available at a design time of the original routing order, including, as in the example above, the detection of an event associated with a determination of insurance fraud), it may not be feasible or even possible to specify the recipient F 402 at that time. Rather, the dynamic nature of the routing operations described herein may be used to allow such updates and extensions to an original routing order.

Figure 5:
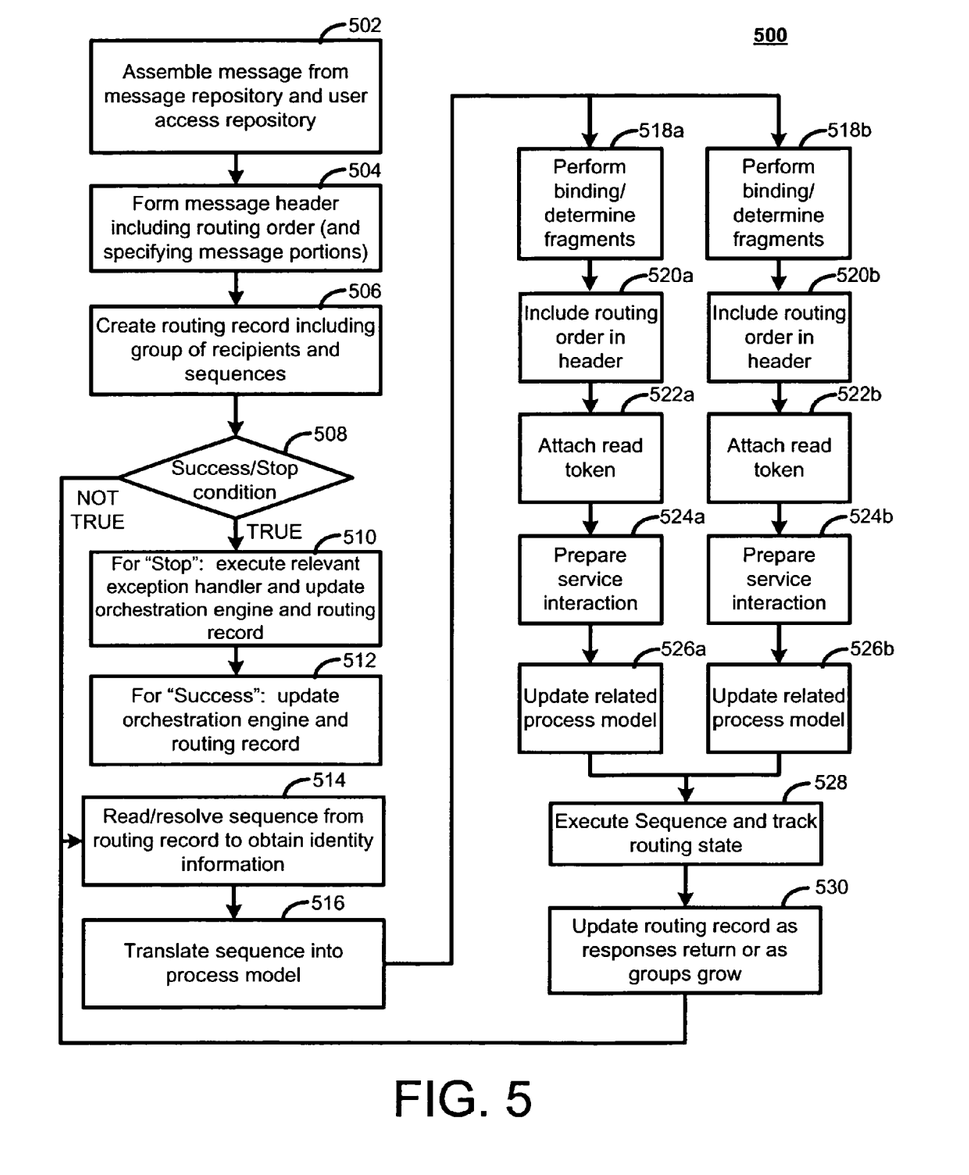
FIG. 5 is a flowchart illustrating an operation of the systems of FIGS. 1, 3, and 4.

FIG. 5 is a flowchart 500 illustrating an operation of the systems of FIGS. 1, 3, and 4. In the example of FIG. 5, an entire routing operation is described and illustrated, along the lines, for example, of the routing operations of FIG. 2. However, in FIG. 5, emphasis is also given to illustrating and explaining various components and examples that are primarily discussed with respect to FIGS. 3 and 4, as well as on details not necessarily explicitly included or discussed above.

In FIG. 5, it is assumed that, as explained, an event occurs which triggers the need for a dynamically routed service interaction, and, in response, a message is assembled from the message repository 122 and from the user access repository 124 (502). Then, a message header may be formed that includes a routing order (504). As already described, the message may include portions or indications/definitions of portions that are secured for access by specific roles and/or recipients specified in the routing order.

Thus, a routing record may be created that includes the routing record as specified over a group of recipients and comprising a plurality of sequences (506). For example, such a routing record may include a routing order having a plurality of sequences, each sequence describing one or more of the group of recipients but not necessarily providing identity information for a given recipient (where, again, a "recipient" should be understood to include a role of a party that may not (yet) be specified with respect to a particular name or designator of a party or entity). Accordingly, the routing record may be used to track different sequences of the routing order, as well as relevant events that may have an effect such as, for example, dynamically changing an ordering of the routing order.

Then, a success or stop condition (508) is evaluated as "true" or "not true" (508). If evaluated as "true" for the stop condition, then a relevant exception handler may be activated, such as the exception handler 308. At this point, if necessary or desired, the orchestration engine 128 and/or the routing record 134 may be updated as to the failure or other stoppage of the routing operations. If evaluated as "true" for the success condition (which presumably would not occur until a later iteration of the process 500), then, again, the orchestration engine 128 and the routing record 134 may be updated.

Otherwise, if evaluated as "not true" for either "stop" or "success," then the process 500 may proceed with a reading and resolving of a (first) sequence of the routing order to obtain identity information (514). For example, as described, a sequence may be resolved based on a number of factors, including, for example, an input of the business application 104, or based on a response from a recipient of a previous sequence (the latter case being generally not applicable in the first sequence of a routing order, if no previous recipient response is available. However, even here, it is possible that a recipient response from a previous routing order may be used to resolve a sequence). Or, a first sequence in a routing order may simply be specified with reference to particular identity information, since, e.g., such identity information may be more readily available for early recipients in a sequence/routing order.

Further, the term identity information should be understood to refer to any aspect of identity information associated with a recipient and/or role, and should not necessarily be read to imply that a full or complete availability of an identity of a recipient may be provided as this stage. For example, where the recipient of a sequence refers only to a role, and not to a specific party, then the term "identity information" may be said to refer to an identity of the role and/or to an identity of one or more of the group of recipients/roles.

Then, the sequence in question may be translated into a process model (516). Such translation may occur with respect to the routing manager 120 and/or the orchestration engine 128, with the result being, for example, a process model that may be easy and straightforward for the orchestration engine 128 to execute.

Then, a series of operations may occur with respect to each one of the members of the sequence being executed. In FIG. 5, these operations are illustrated as including two recipients using interleaved parallel routing; however, it should be understood that this is merely by way of example, and that greater or fewer recipients may be included, and/or may be included in a different order.

Thus, for each recipient in the sequence, any binding of a role to a concrete entity or fragmentation of the message in question that is required may be performed (518a/518b). For example, the role binder 310 and/or the message fragmenter 312 of the routing manager 120 may be used in these operations.

Information regarding the routing order may then be included in the header of each message portion (520a/520b). Since the sequence involves interleaved parallel routing, as referenced above, a read token is attached to each message portion (522a/522b). However, if normal parallel routing or some other type of message routing were used, then a write token may be applied, as would be apparent for the context.

Then, a service interaction is prepared (524a/524b) to send a message (and/or receive a response), since, in this example, it may be assumed that the recipients (e.g., the recipients 110-116) represent services, as referenced above. In general, such service interactions are known, for example, to be implemented in situations in which different parties (here, recipients), each with its own internal processes, may need to interact with one another. To achieve these goals, the services agree to certain rules. As already described above, BPEL may be used for capturing processes of such parties (recipients) including external interactions with other parties (recipients). However, other languages, such as, for example, the Web Services Flow Language (WSFL), the eXtensible language (XLANG), and/or the Business Process Modeling Language (BPML) also may be used.

Finally for the recipient-specific operations, a process model(s) related to the service interactions and the sequence in question may be updated (526a/526b). For example, at this stage both a recipient and a message are known for each stage of the sequence, and may be specified accordingly within the process model. More generally, all or any of the information just determined (e.g. a binding result) may be updated within the process model.

At this point, the sequence may be executed and the routing state tracked (528). For example, the sequence may be executed through the orchestration engine and tracked through the message log 132 (e.g., using the routing record 134). Specifically, the routing record may be updated for send interactions and the receive interactions that occur as a result. In this regard, it should be understood that for many process models, the orchestration engine 128 merely executes what has been configured by the routing manager 120 and related components.

In inter-leaved parallel routing, however, the orchestration engine 128 may execute in a typical fashion, except that content of the message for the write phase may be dynamically configured. In inter-leaved parallel routing, as described, recipients receive read-only copies of the message, and whichever recipient requests access receives a write token, with data possibly reflecting update(s) by previous recipients. To achieve this result, in one implementation, the orchestration engine 128 may request materialization by the routing manager of a write message following a reading by the same recipient.

Finally in FIG. 5, the routing record may be updated as responses return and/or as the group(s) of recipients grow (if allowed to do so) (530). As responses return, routing data may be filtered from the message portions (e.g., by the filter 306) before being stored in the routing record 134 and/or passed to the business application 104 (from where the message repository may be updated). As already described, the routing order may be changed by examining application-specific events that are determined during the routing operations, and that are analyzed by the business rule processor 136. For example, where a recipient flags a problem that will result in a designation of the next recipient according to a "(dyn-next)" sequence, the occurrence may be logged with the routing record 134 through the routing manager 120.

In implementations in which some type of parallel branching occurs, it may happen that there is contention with regard to determining the next recipient. In such cases, events may be defined that may be interpreted by the business rule processor to make the determination and resolve the contention.

As already described, relevant portions of the process 500 may continue/iterate, as long as further sequences have been defined (514). In this way, sequences may be resolved at run-time in a flexible manner, and new sequences may be defined and implemented, while current sequences are executing.

Although some examples have been provided herein, it should be understood that many other scenarios and situations exist in which dynamic routing as described herein may be used. For example, a project proposal initiated by a project coordinator may be required to be passed through work-package coordinators in any order, one at a time. Accordingly, inter-leaved parallel routing may be used, so that, for each route, all coordinators receive read-only copies. Then, the first coordinator expressing interest in performing the write operation obtains write access, and this process continues, so that each coordinator is ensured of seeing all updates that have already occurred with respect to other coordinators.

Further, after a particular update, a problem may be detected and flagged by one of the coordinators, and the proposal may then be routed back to the project coordinator. Such an instance would override the otherwise-planned next operation of the routing, and a modification may be issued by the project coordinator.

Additionally, although various examples of dynamic changes to a routing order are provided above, it should be understood that many other such dynamic changes may be implemented. For example, an addition to recipient lists dynamically growing, it is possible that they may be reduced. Such a dynamic change may be signified in a routing order by appropriate notation. For example, a routing order for the recipients 110-116 may be written as "Over ABCD*-: ABCD." Then, during run-time, the list ABCD may be reduced by one or more of the recipients 110-116. The original list specification of ABCD may establish a broad constraint(s) that may not be over-ridden, e.g., that an order of ABCD may not change, but that the list may be reduced. As with dynamic addition or growth, an event may be attached to the "*" to determine whether and how new recipients may be removed (and/or added). Further, a structure of the sequences of the routing order may be allowed to change with respect to one another (again, perhaps constrained by original constraints in the original specification of the routing order). Many other variations and implementations may be used.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program described above, can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Methods may be performed by one or more programmable processors executing a computer program to perform functions by operating on input data and generating output. Methods also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

Thus, while certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
    determining a routing order for routing a message among a group of recipients, the routing order including a plurality of sequences in which each sequence specifies a subset of the recipients by defining, for each recipient in the subset, a routing relationship relative to at least one other recipient of the group of recipients within the routing order;
    resolving a first sequence of the plurality of sequences of the routing order to determine first identity information for a first subset of the group of recipients having a first routing relationship, wherein the first subset having the first identity information includes any of the group of recipients;
    translating the first sequence, including the first routing relationship, and the first identity information into a first process model;
    routing the message among the first subset of recipients, according to the first routing relationship and using the first identity information, by executing the first process model, wherein routing the message among the first subset of recipients includes routing the message within and among the first subset of recipients;
    receiving a recipient response from at least one recipient of the first subset of the group of recipients during run-time of the first process model;
    resolving, based on the executing of the first process model and based on the recipient response, a second sequence of the plurality of sequences of the routing order to determine second identity information for a second subset of the group of recipients having a second routing relationship, wherein the second subset having the second identity information includes any remaining recipients of the group of recipients after the routing of the message among the first subset;
    translating the second sequence, including the second routing relationship, and the second identity information into a second process model; and
    routing the message among the second subset of recipients, according to the second routing relationship and using the second identity information, by executing the second process model.

2. The method of claim 1 wherein determining a routing order comprises:
    determining an event that initiates a set of dynamically-routed service interactions with one or more of the recipients in the group of recipients.

3. The method of claim 1 wherein determining a routing order comprises:
    creating a routing record for tracking message and/or routing state information during the routing of the message among the group of recipients.

4. The method of claim 1 wherein determining a routing order comprises:
    fragmenting the message into one or more portions, each portion being associated with at least one of the group of recipients.

5. The method of claim 1 wherein resolving the second sequence of the routing order comprises:
    determining the identity information based on content of the message as determined from the recipient response.

6. The method of claim 1 wherein resolving the second sequence of the routing order comprises:
    providing the recipient response to an application;
    receiving, from the application, an evaluation of an event associated with the recipient response; and
    resolving the second sequence, based on the evaluation.

7. The method of claim 6 wherein providing the recipient response to an application comprises:
    filtering routing information from a message header of the message as received from a recipient providing the recipient response; and
    providing message content from the message to the application.

8. The method of claim 1 wherein resolving the second sequence of the routing order comprises:
determining an authorization of a recipient to provide input in the resolving of the second sequence.

9. The method of claim 1 wherein executing the first process model to route the message among the first subset comprises:
binding a role associated with at least one of the group of recipients described in the first sequence and associated with corresponding first identity information with a concrete entity for receiving the message.

10. The method of claim 1 wherein executing the first process model to route the message among the first subset comprises:
determining that routing of the message among the first subset has entered a live-locked state; and
executing a stop condition to halt the routing.

11. The method of claim 1 wherein executing the first process model to route the message among the first subset comprises:
tracking a routing state of the message in a routing record.

12. The method of claim 1 wherein the second sequence of the routing order is resolved by receiving a recipient response from a recipient of the first subset during run-time of the first process model, and resolving the second sequence of the routing order, based on the recipient response.

13. The method of claim 1 wherein the routing relationships of the routing order are expressed in a routing language, and wherein translating the first sequence includes converting the first sequence expressed in the routing language into an executable language defining the first process model and executable by an orchestration engine.

14. A system including instructions recorded on a non-transitory computer readable storage medium and executable by at least one processor, the system comprising:
a routing manager configured to cause the at least one processor to maintain a routing order for routing a message among a group of recipients, the routing order including a plurality of sequences in which each sequence specifies a subset of the recipients by defining, for each recipient in the subset, a routing relationship relative to at least one other recipient of the group of recipients within the routing order, wherein the routing manager is configured to cause the at least one processor to resolve a first sequence of the plurality of sequences of the routing order to determine first identity information for a first subset of the group of recipients having a first routing relationship, and further configured to cause the at least one processor to translate the first sequence, including the first routing relationship, and the first identity information into a first process model, wherein the first subset having the first identity information includes any of the group of recipients; and
an orchestration engine that is configured to cause the at least one processor to execute the first process model and thereby coordinate the routing of the message among the first subset of recipients, according to the first routing relationship and using the first identity information, wherein routing the message among the first subset of recipients includes routing the message within and among the first subset of recipients,
wherein the routing manager is further configured to cause the at least one processor to receive a recipient response from at least one recipient of the first subset of the group of recipients during run-time of the first process model, wherein the routing manager is further configured to cause the at least one processor to resolve, based on the executing of the first process model and based on the recipient response, a second sequence of the plurality of sequences of the routing order to determine second identity information for a second subset of the group of recipients having a second routing relationship, and to translate the second sequence, including the second routing relationship, and the second identity information into a second process model, wherein the second subset having the second identity information includes any remaining recipients of the group of recipients after the routing of the message among the first subset, and
wherein the orchestration engine is further configured to cause the at least one processor to execute the second process model and thereby coordinate the routing of the message among the second subset of recipients, according to the second routing relationship and using the second identity information.

15. The system of claim 14 comprising:
a message log including a routing record, the routing record being operable to track a routing state of the message during execution of the first process model and the second process model.

16. The system of claim 14 wherein the routing manager is configured to cause the at least one processor to update the routing order based on the execution of the first process model by the orchestration engine, wherein the update of the routing order comprises including a dynamically-determined recipient not specified in the routing order at a design-time thereof.

17. The system of claim 14 wherein the routing relationship includes a description of an ordering of the corresponding subset of the group of recipients within the corresponding sequence, the descriptions describing one or more of: a listing of the group of recipients, a requirement for a parallel routing of the message among at least two of the group of recipients, a requirement for an inter-leaved parallel routing of the message among at least two of the group of recipients, a requirement for sequential routing of the message, or dynamically-determined identity information for a next one of the group of recipients.

18. A computer program product comprising:
a non-transitory computer-readable storage medium bearing instructions that, when loaded into a memory of a computing system, cause the computing system to:
determine a routing order for routing a message among a group of recipients, the routing order including a plurality of sequences in which each sequence specifies a subset of the recipients by defining, for each recipient in the subset, a routing relationship relative to at least one other recipient of the group of recipients within the routing order;
resolve a first sequence of the plurality of sequences of the routing order to determine first identity information for a first subset of the group of recipients having a first routing relationship, wherein the first subset having the first identity information includes any of the group of recipients;
translate the first sequence, including the first routing relationship, and the first identity information into a first process model;
route the message among the first subset of recipients, according to the first routing relationship and using the first identity information, by executing the first process model, wherein routing the message among the first subset of recipients includes routing the message within and among the first subset of recipients;

receive a recipient response from at least one recipient of the first subset of the group of recipients during run-time of the first process model;

resolve, based on the executing of the first process model and based on the recipient response, a second sequence of the plurality of sequences of the routing order to determine second identity information for a second subset of the group of recipients having a second routing relationship, wherein the second subset having the second identity information includes any remaining recipients of the group of recipients after the routing of the message among the first subset;

translate the second sequence, including the second routing relationship, and the second identity information into a second process model; and route the message among the second subset of recipients, according to the second routing relationship and using the second identity information, by executing the second process model.

19. The computer program product of claim 18 wherein the routing order is maintained using a routing record for tracking message and/or routing state information during the routing of the message among the group of recipients.

* * * * *